United States Patent [19]
McDonald et al.

[11] Patent Number: 5,661,623
[45] Date of Patent: Aug. 26, 1997

[54] GROUND FAULT CIRCUIT INTERRUPTER PLUG

[75] Inventors: Thomas M. McDonald, Monroe; Ward E. Strang, Fairfield; Carol Z. Howard, Oxford, all of Conn.

[73] Assignee: Hubbell Corporation, Orange, Conn.

[21] Appl. No.: 446,312

[22] Filed: May 22, 1995

Related U.S. Application Data

[63] Continuation-in-part of Ser. No. 115,020, Sep. 2, 1993, Pat. No. 5,418,678.

[51] Int. Cl.$^6$ .................................................. H02H 3/00
[52] U.S. Cl. .................................................. 361/42; 361/45
[58] Field of Search .................................. 361/42, 45, 38, 361/115; 335/18

[56] References Cited

U.S. PATENT DOCUMENTS

| | | | |
|---|---|---|---|
| 3,548,259 | 12/1970 | McDonald | 317/18 |
| 4,197,567 | 4/1980 | Dietz et al. | 361/45 |
| 4,567,456 | 1/1986 | Legatti | 335/20 |
| 4,567,544 | 1/1986 | Ronemus | 361/42 |
| 4,568,997 | 2/1986 | Bienwald et al. | 361/45 |
| 4,979,070 | 12/1990 | Bodkin | 361/42 |
| 5,229,730 | 7/1993 | Legatti et al. | 335/18 |
| 5,304,068 | 4/1994 | Welch | 361/45 |

OTHER PUBLICATIONS

Photographs of Model GFP-115 Portable Plug-In GFCI, Hubbell Incorporated.
Photographs of Model GFP-115A Portable Plug-In GFCI, Hubbell Incorporated.
Photographs of Model GFP-4C15M Manual Set Portable GFCI Line Cord, Hubbell Incorporated.
Photographs of Omron 10-Amp, 100 VAC Portable Residual Current Device.
Photographs of Model 14880 Plug-In GFCI, Technology Research Corporation.

*Primary Examiner*—Jeffrey A. Gaffin
*Assistant Examiner*—Stephen Jackson
*Attorney, Agent, or Firm*—Jerry M. Presson; John E. Holmes

[57] ABSTRACT

A ground fault circuit interrupter (GFCI) line cord plug utilizes an electronically latched relay, rather than a circuit breaker or other type of mechanical latching device, to interrupt the AC load power when a ground fault condition occurs. In order to reduce the size of the relay and minimize the cost and complexity of the GFCI plug, the fixed and movable relay contact structures are mounted directly to the circuit board which carries the remaining components of the GFCI circuit. In a preferred embodiment, the fixed relay contact structures are integral with the plug blades of the GFCI plug. The movable relay contact structures preferably comprise deflectable spring arms which are preloaded when the relay contacts are in the open position in order to control the contact gap, and which are deflected past the point of contact closure when the relay contacts are in the closed position in order to increase the closing force. The principal electrical components of the GFCI plug, including the relay contacts, relay coil and sensing transformer, are mounted on the circuit board in a generally tandem or in-line arrangement in order to minimize the dimensions of the plug.

23 Claims, 7 Drawing Sheets

GROUND FAULT CIRCUIT INTERRUPTER PLUG

REFERENCE TO RELATED APPLICATION

This application is a continuation-in-part of prior application Ser. No. 08/115,020, filed by Thomas M. McDonald on Sep. 2, 1993 and entitled "Manually Set Ground Fault Circuit Interrupter", now U.S. Pat. No. 5,418,678, the disclosure of which is incorporated herein by reference.

FIELD OF THE INVENTION

The present invention relates to a ground fault circuit interrupter (GFCI) device for protecting an AC load circuit. More specifically, the invention relates to a GFCI device that is embodied in a line cord plug and utilizes a relay, rather than a circuit breaker or other type of mechanical latching device, to open and close the AC load circuit.

BACKGROUND OF THE INVENTION

Conventional GFCI devices are designed to trip in response to the detection of a ground fault condition at an AC load. Generally, the ground fault condition results when a person comes into contact with the line side of the AC load and an earth ground at the same time, a situation which can result in serious injury. The GFCI device detects this condition by using a sensing transformer to detect an imbalance between the currents flowing in the line and neutral conductors of the AC supply, as will occur when some of the current on the line side is being diverted to ground. When such an imbalance is detected, a mechanically latched circuit breaker within the GFCI device is immediately tripped to an open condition, thereby opening both sides of the AC line and removing all power from the load. Many types of GFCI devices are capable of being tripped not only by contact between the line side of the AC load and ground, but also by a connection between the neutral side of the AC load and ground. The latter type of connection, which may result from a defective load or from improper wiring, is potentially dangerous because it can prevent a conventional GFCI device from tripping at the intended threshold level of differential current when a line-to-ground fault occurs.

GFCI devices may be connected to fuse boxes or circuit breaker panels to provide central protection for the AC wiring throughout a commercial or residential structure. More commonly, however, GFCI devices are incorporated into electrical receptacles that are designed for installation at various locations within a building. A typical receptacle configuration, as shown, for example, in U.S. Pat. No. 4,568,997, to Bienwald et al, includes test and reset pushbuttons and a lamp or light-emitting diode (LED) which indicates that the circuit is operating normally. When a ground fault occurs in the protected circuit, or when the test button is depressed, the GFCI device trips and an internal circuit breaker opens both sides of the AC line. The tripping of the circuit breaker causes the reset button to pop out and the LED to be extinguished, providing a visual indication that a ground fault has occurred. In order to reset the GFCI device, the reset button is depressed in order to close and latch the circuit breaker, and this also causes the LED to illuminate once again.

Portable GFCI devices have been designed for use in situations where the available AC power supply circuit does not include a central or receptacle-type GFCI device. These portable devices may be incorporated into line cords, extension cords or plug-in units, and are often used with power tools and other types of potentially hazardous power equipment at construction sites and the like. Examples of portable GFCI devices may be found in U.S. Pat. No. 4,197,567, to Dietz et al, and in U.S. Pat. No. 5,229,730, to Legatti et al. However, like the receptacle-type GFCI devices described previously, portable GFCI devices typically rely on mechanical circuit breakers to trip in response to the ground fault condition. Mechanical circuit breakers add undesirable complexity and expense to the GFCI circuit, and are also subject to failure due to the mechanical nature of the tripping and latching functions.

Newer types of GFCI devices employ relays, rather than circuit breakers or other types of mechanical latching devices, to interrupt the load power when a ground fault condition occurs. An electronic circuit controls the flow of current to the relay coil, and the relay contacts serve to open and close both sides of the AC line in response to the presence or absence of a ground fault condition. In these devices, only a simple momentary pushbutton switch is needed to perform the reset function, since latching of the relay contacts is performed electronically rather than mechanically. This results in a simpler, less expensive and more reliable device. As disclosed in the aforementioned copending patent application of Thomas M. McDonald, Ser. No. 08/115,020, a relay-type GFCI device can be designed to incorporate a manual set feature, wherein the reset pushbutton must be depressed before power can be applied to an AC load. This provides protection against unexpected starting of the AC load when the GFCI device is initially connected or after a power supply interruption, which can be dangerous when power equipment is involved.

Unfortunately, the substitution of a relay-type circuit for a mechanical circuit breaker is difficult in the case of portable GFCI devices, particularly those which are incorporated into AC line cord plugs. These devices must be relatively small in order to perform their intended function, and a conventional relay, which must be mounted on a circuit board along with the relatively large number of electrical components required for the latching and tripping functions, takes up a considerable amount of space. Ideally, it would be desirable to reduce the size of a relay-type GFCI device so that it can be incorporated into an AC line cord plug of relatively small dimensions.

SUMMARY OF THE INVENTION

A primary object of the present invention is to provide a relay-type GFCI device which is relatively small and compact, allowing it to be incorporated into an AC line cord plug.

A further object of the invention is to provide a relay-type GFCI device in which a novel arrangement of relay contacts is employed, both to reduce the size of the relay and to minimize the cost and complexity of the GFCI device.

Still another object of the invention is to provide a relay-type GFCI device in which the principal electrical components of the device, including the relay contacts, relay coil and sensing transformer, are mounted on a circuit board in a generally tandem or in-line arrangement in order to minimize the dimensions of the device.

The foregoing objects are substantially achieved by providing a ground fault circuit interrupter plug which comprises a housing having a pair of plug blades for connection to an AC receptacle and a pair of output terminals for connection to an AC load, and electrical circuitry within the housing for providing ground fault protection to an AC load connected to the output terminals. The electrical circuitry includes a relay comprising a relay coil and a pair of relay contact sets for selectively connecting and disconnecting the plug blades and the output terminals. The electrical circuitry also includes an electronic circuit coupled to the relay coil for maintaining the relay contact sets in a closed position to connect the plug blades to the output terminals in the absence of a ground fault condition, and for causing the relay contact sets to move to an open position to disconnect the plug blades from the output terminals in response to a ground fault condition.

In accordance with another aspect of the present invention, a relay contact arrangement for use in a ground fault circuit interrupter plug comprises a circuit board, an integral plug blade and fixed relay contact structure carried by the circuit board, a movable relay contact structure carried by the circuit board, and an actuator for moving the movable relay contact structure into and out of contact with the fixed relay contact structure.

In accordance with a still further aspect of the present invention, a method for opening and closing the line or neutral side of an AC load in a ground fault circuit interrupter is provided. The method comprises the steps of providing a fixed relay contact structure and a movable relay contact structure which is movable into and out of contact with the fixed relay contact structure, with the movable contact structure being provided in the form of a cantilevered spring arm having a secured end, a free end, and a contact portion located at intermediate point between the secured end and the free end for contacting the fixed relay contact structure; connecting one of the fixed and movable relay contact structures to the line or neutral side of an AC source and the other of the fixed and movable relay contact structures to the same side of the AC load; opening the line or neutral side of the AC load by moving the spring arm to a first stop position in which the spring arm is not in contact with the fixed contact structure; and closing the line or neutral side of the AC load by applying a force to the free end of the spring arm to move the spring arm to a second stop position in which the spring arm is deflected to bring the contact portion thereof into contact with the fixed relay contact structure. The distance moved by the free end of the spring arm from the first stop position to the second stop position is greater than the distance necessary to bring to the contact portion of the spring arm into contact with the fixed contact structure, so that the closing force applied between the contact portion of the spring arm and the fixed relay contact structure is increased.

BRIEF DESCRIPTION OF THE DRAWINGS

Referring now to the drawings, which form a part of the original disclosure.

DETAILED DESCRIPTION OF THE PREFERRED EMBODIMENTS

Figure 2:
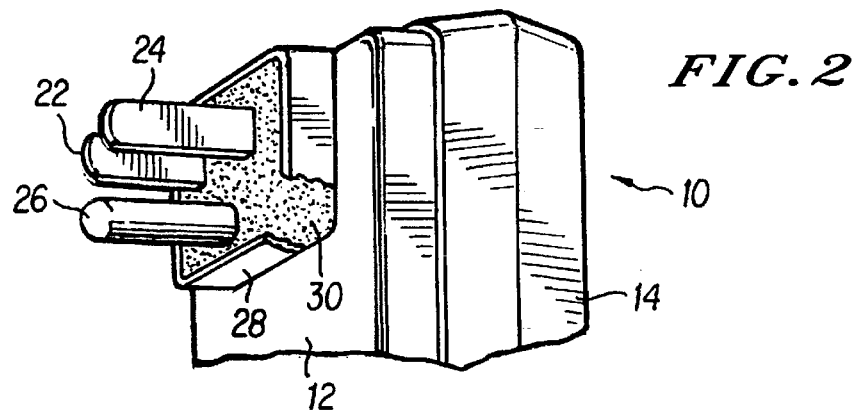
FIG. 2 is partial cut-away view of the ground fault circuit interrupter plug of FIG. 1.
Figure 1:
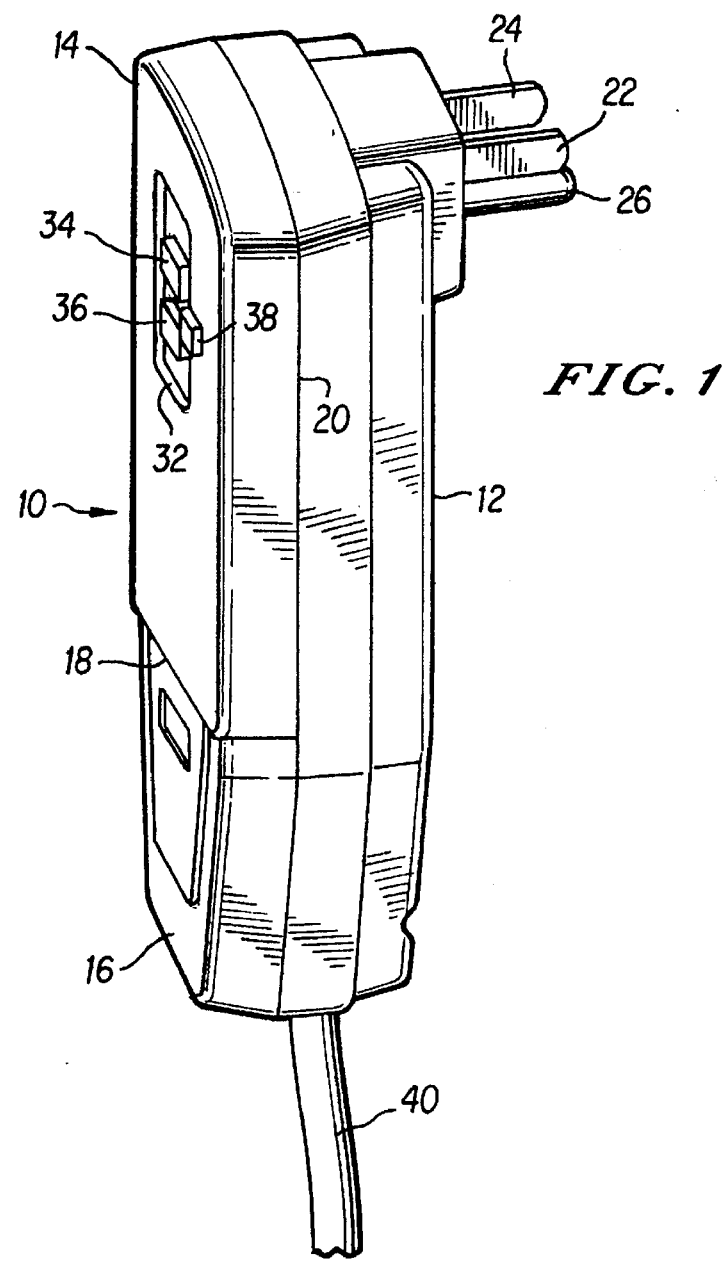
FIG. 1 is an external perspective view of a ground fault circuit interrupter plug constructed in accordance with a preferred embodiment of the present invention.

A ground fault circuit interrupter plug (GFCI) 10 constructed in accordance with a preferred embodiment of the present invention is illustrated in FIGS. 1 and 2. The GFCI plug 10 includes a plastic housing which is made up of a rear cover 12, a front cover 14 and a wiring chamber cover 16. The rear cover 12 extends vertically from one end of the GFCI plug 10 to the other, while the front cover 14 has a lower edge 18 which terminates some distance above the bottom of the GFCI plug 10. The remaining distance between the bottom edge 18 of the front cover 14 and the bottom of the GFCI plug 10 is occupied by the wiring chamber cover 16. The front cover 14 is joined to the rear cover 12 along its entire perimeter by an adhesive along a seam line 20 to form a watertight enclosure. The wiring chamber cover 16 is joined to the rear cover 12 by screws (not shown) so that the wiring chamber cover 16 can be removed for the purpose of attaching or removing an AC line cord. In a preferred embodiment, the GFCI plug 10 is approximately 5 inches in height, approximately 2 inches in width and (except in the area of the plug blades) approximately 1.5 inches in depth.

As best seen in FIG. 2, a pair of plug blades 22 and 24 and a ground pin 26 project horizontally outward from the rear cover 12 of the GFCI plug 10 to allow it to be connected to a conventional three-prong, grounded AC receptacle. The plug blade 22 corresponds to the line (hot) side of the AC receptacle, and the plug blade 24 corresponds to the neutral side of the AC receptacle. In some embodiments, the plug blades 22 and 24 may be of different sizes to insure proper polarization; however, this is not necessary when a ground pin 26 is employed as in the illustrated embodiment. In order to preserve the watertight nature of the portion of the GFCI housing between by the covers 12 and 14, a generally rectangular flange 28 is formed around the plug blades 22, 24 and ground pin 26 to form a shallow cavity with the wall of the rear cover 12. This cavity is filled with a potting compound 30 which seals the gaps through which the plug blades 22 and 24 and ground pin 26 protrude through the wall of the rear cover 12. The potting compound 30 also provides additional rigidity to the plug blades 22 and 24, and prevents deflection of the plug blades 22 and 24 from being transmitted to the internal portions of the blades. This is a significant advantage since, as will be described in more detail below, the internal portions of the plug blades 24 and 26 form part of the relay contact structure of the GFCI circuitry.

Referring once again to FIG. 1, the front cover 14 of the GFCI plug 10 is formed with a recessed area 32 in which two momentary pushbutton switches 34 and 36 are provided. The pushbutton switch 34 serves as a TEST switch which allows the GFCI plug 10 to be tested by simulating a ground fault condition. The second pushbutton 36 serves as either a SET or RESET switch, depending upon whether the internal circuitry of the GFCI plug 10 is designed to provide manual or automatic setting, as will be discussed in more detail hereinafter. Both of the pushbutton switches 34 and 36 are preferably of the waterproof, rubber membrane or keypad type, as described in copending, commonly-assigned patent application Ser. No. 08/229,855, filed by Ward E. Strang et al. on Apr. 19, 1994 and entitled "Button Well Compression Seal Assembly", now U.S. Pat. No. 5,442,115, said application being incorporated herein by reference. In this type of switch, depression of the pushbutton 34 or 36 causes an internally-mounted conductive tab or layer to make contact with two conductive traces on the rear surface of a printed circuit board housed within the GFCI plug 10. Located adjacent to the pushbutton switches 34 and 36, at the edge of the recessed area 32, is a lens 38 for a light emitting diode (LED) or a neon bulb carried by the circuit board within the GFCI plug 10. The LED or neon bulb, when illuminated, provides an indication that the relay contacts within the GFCI plug 10 are closed and that power is available at the AC receptacle to which the GFCI plug 10 is connected.

As illustrated in FIG. 1, the GFCI plug 10 has a generally vertical, upstanding configuration, with the plug blades 22 and 24 and ground pin 26 extending horizontally outward from the upper rear portion of the housing and with the pushbuttons 34 and 36 and lens 38 accessible at the front of the housing. A field-wired AC line cord 40 extends from the bottom of the GFCI plug 10 and serves to connect the GFCI plug 10 to an AC load (not shown), which may consist of a power tool, appliance or the like. When the plug blades 22 and 24 and ground pin 26 are inserted into a conventional three-prong AC receptacle, the GFCI plug 10 serves as a line cord plug for the AC load device to which it is attached by means of the line cord 40. It will be appreciated that the generally vertical, elongated configuration of the GFCI plug 10 is advantageous minimizing its depth and increasing its stability when connected to a wall-mounted AC receptacle.

Figure 3:
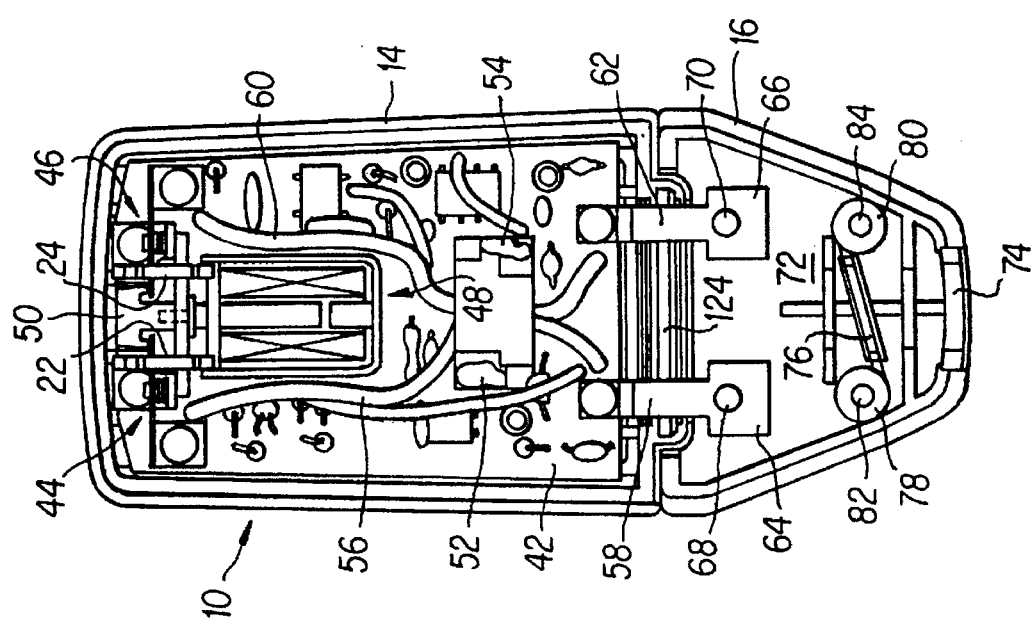
FIG. 3 is an elevational view of the ground fault circuit interrupter plug of FIG. 1, with a rear cover removed to illustrate certain internal components.

FIG. 3 is an elevational view of the GFCI plug 10 as viewed from the right-hand side in FIG. 1, with the rear cover 12 removed and the line cord 40 not yet attached. The front cover 14 defines a shallow, generally rectangular cavity in which a similarly shaped circuit board 42 is received. The circuit board 42 provides physical support for the plug blades 22 and 24, and also carries the various electrical components that are required to detect and respond to ground fault conditions. These include a relay contact set 44 for opening and closing the line side of the AC supply, a similar relay contact set 46 for opening and closing the neutral side of the AC supply, a relay coil and plunger assembly 48 for opening and closing the relay contact sets 44 and 46 by means of an actuator 50, and a pair of toroidal transformers 52 and 54 which are used to detect ground fault conditions. A line conductor 56 connects the load side of the relay contact set 44 to a line output terminal 58, and a neutral conductor 60 connects the load side of the relay contact set 46 to a neutral output terminal 62. The line and neutral conductors 56 and 60 both pass through the cores of the transformers 52 and 54 and are attached at their lower ends to conductive traces (located on the reverse side of the printed circuit board 42 and not visible in FIG. 3) which establish contact with the output terminals 58 and 62. The lower ends 64 and 66 of the output terminals 58 and 62, respectively, are provided with an enlarged rectangular shape to serve as nut plates. Holes 68 and 70 are formed in the nut plates to accommodate screws 69 (shown in FIG. 5) which are used with corresponding nuts 71 (also visible in FIG. 5) to secure the line and neutral conductors of the AC line cord 40 of FIG. 1 to the output terminals 58 and 62. The two screws 69 and/or nuts 71 may have different colors (e.g., by applying a nickel plating to a brass screw or nut) to visually distinguish the line and neutral terminals from each other. A cavity 72 within the wiring chamber cover 16 provides an enclosure for the nut plates 64 and 66 and for the exposed ends of the line cord conductors when the wiring chamber cover 16 is secured to the rear cover 12 of FIG. 1. A crescent shaped aperture 74 is provided at the bottom of the wiring chamber cover 16 to allow the line cord 40 of FIG. 1 to pass out of the GFCI plug 10, and a curved plastic rib 76 within the wiring chamber 72 bears against the line cord 40 to provide strain relief. Two cylindrical plastic bosses 78 and 80 are formed on either side of the rib 76 and contain holes 82 and 84, respectively, for receiving the threaded ends of a pair of screws (not shown). The screws are carried by the rear cover 12 and serve to releasably connect the wiring chamber cover 16 to the rear cover 12. This allows the wiring chamber cover 16 to be removed from the rear cover 12 so that the line and neutral conductors of the line cord 40 of FIG. 1 can be attached to the nut plates 64 and 66, and allows the wiring chamber cover 16 to then be reattached to the rear cover 12 to enclose the wiring chamber 72.

Figure 4:
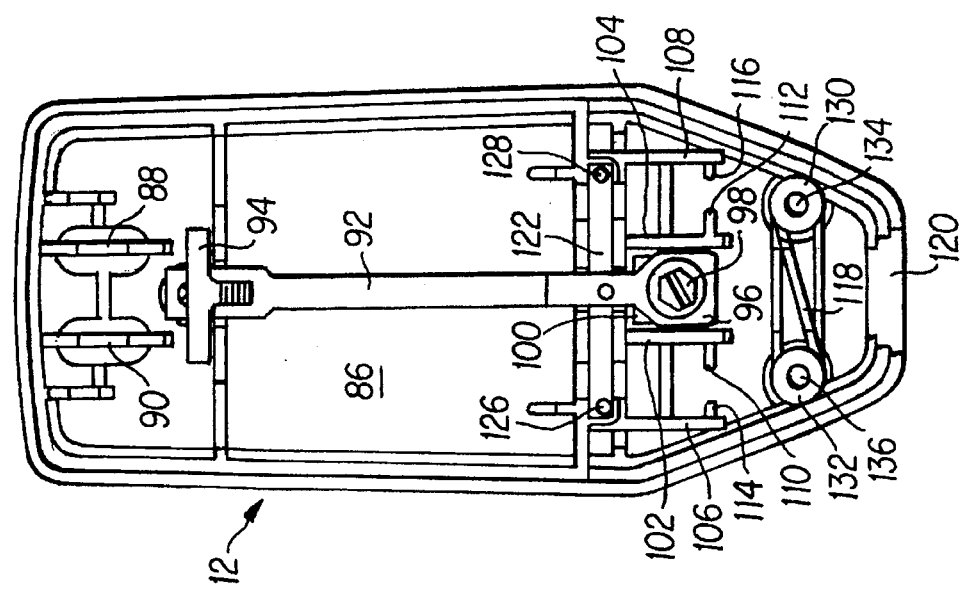
FIG. 4 is an elevational view of the rear cover that has been removed from the ground fault circuit interrupter plug in FIG. 3, illustrating the internal details thereof.

FIG. 4 is an elevational view illustrating the interior of the rear cover 12 which has been removed from the GFCI plug 10 in FIG. 3. The rear cover 12 defines a cavity 86 which houses the components carried by the circuit board 42 and closes off the wiring chamber 72 when the rear cover 12 is joined to the front cover 14 and wiring chamber cover 16, respectively. In the upper portion of the cavity 86 are two vertical slots 88 and 90 through which the plug blades 22 and 24, respectively, pass to reach the outside of the GFCI plug 10. Below the slots 88 and 90 is a grounding strap 92 which extends vertically in the cavity 86 and carries the grounding pin 26 of FIGS. 1 and 2 at its upper end. A generally T-shaped plastic retainer 94 is held in contact with the upper end of the grounding strap 92 and serves as a spacer between the grounding strap 92 and the relay coil and plunger assembly 48 of FIG. 3 when the GFCI plug 10 is fully assembled. At its lower end, the grounding strap 92 terminates in a nut plate 96 that is generally similar to the nut plates 64 and 66 of FIG. 3. A screw 98 passes through a hole (not shown) in the nut plate 96 and engages a nut 100 on the opposite side of the nut plate, identical to the manner in which screws and nuts are carried by the nut plates 64 and 66 of FIG. 3. The screw 98 and nut 100 are used to connect the bare end of a ground conductor of the line cord 40 of FIG. 1 to the ground strap 92 of FIG. 4. This provides electrical continuity between the ground pin 26 of FIGS. 1 and 2, and the ground conductor of the line cord 40. The nut plate 96 of FIG. 4 is received between a pair of vertical plastic walls 102 and 104 which are formed integrally within the rear cover 12. The walls 102 and 104 serve to locate the nut plate in the proper position and to prevent contact between the nut plate 96 and the adjacent nut plates 64 and 66 of FIG. 3 when the GFCI plug 10 is fully assembled. Additional integral plastic walls 106 and 108 are provided in spaced-apart, parallel relationship with the walls 102 and 104 in order to capture and locate the nut plates 64 and 66 of FIG. 3. During attachment of the line, neutral and ground conductors of the line cord 40 of FIG. 1 to the GFCI plug 10, the square nuts 71 (visible in FIG. 5) carried by the nut plates 64 and 66 of FIG. 3 are prevented from turning with the screws of 69 by short transverse walls 110, 112, 114 and 116 which are carried by the plastic walls 102, 104, 106 and 108, respectively. Similar transverse walls (not visible in FIG. 4) are provided for restraining the nut 100.

Also visible in FIG. 4 is a curved plastic rib 118 which is similar to the rib 76 of FIG. 3, and which bears against the opposite side of the line cord 40 when the GFCI plug 10 is fully assembled. A semicircular aperture 120 is provided at the bottom of the rear cover 12 and mates with the aperture 74 of FIG. 3 to provide an opening for the line cord 40 at the bottom of the GFCI plug 10. In order to seal the cavity 86 against the entry of water or moisture, the rear cover 12 of FIG. 4 includes a horizontally extending cavity 122 which mates with a similar cavity 124 formed by a plastic structure at the bottom of the front cover 14 in FIG. 3. When the rear cover 12 and front cover 14 are joined, the cavities 122 and 124 together form a closed chamber through which the output terminals 58 and 62 of FIG. 3 and the ground strap 92 of FIG. 4 pass. A circular hole 126 in the back wall of the rear cover 12 provides communication between this chamber and the outside of the GFCI plug 10, and a potting compound is injected through the hole 126 to fill the chamber during assembly of the GFCI plug 10. This provides effective sealing of the lower portion of the cavity 86 of FIG. 4 when the GFCI plug 10 is fully assembled. A smaller hole 128 on the opposite side of the chamber from the hole 126 provides venting for the chamber 122, 124 during injection of the potting compound.

At the bottom of the rear cover 12, a pair of cylindrical bosses 130 and 132 are formed at positions corresponding to those of the cylindrical bosses 78 and 80 of FIG. 3. Holes 134 and 136 are formed in the cylindrical bosses 130 and 132, respectively, and these holes extend to the rear surface of the rear cover 12 to receive the head portions of the screws (not shown) referred to previously. These screws engage the threaded holes 82 and 84 in the cylindrical bosses 78 and 80 of the wiring chamber cover 16 in FIG. 3 to releasably attach the wiring chamber cover 16 to the rear cover 12.

Figure 5:
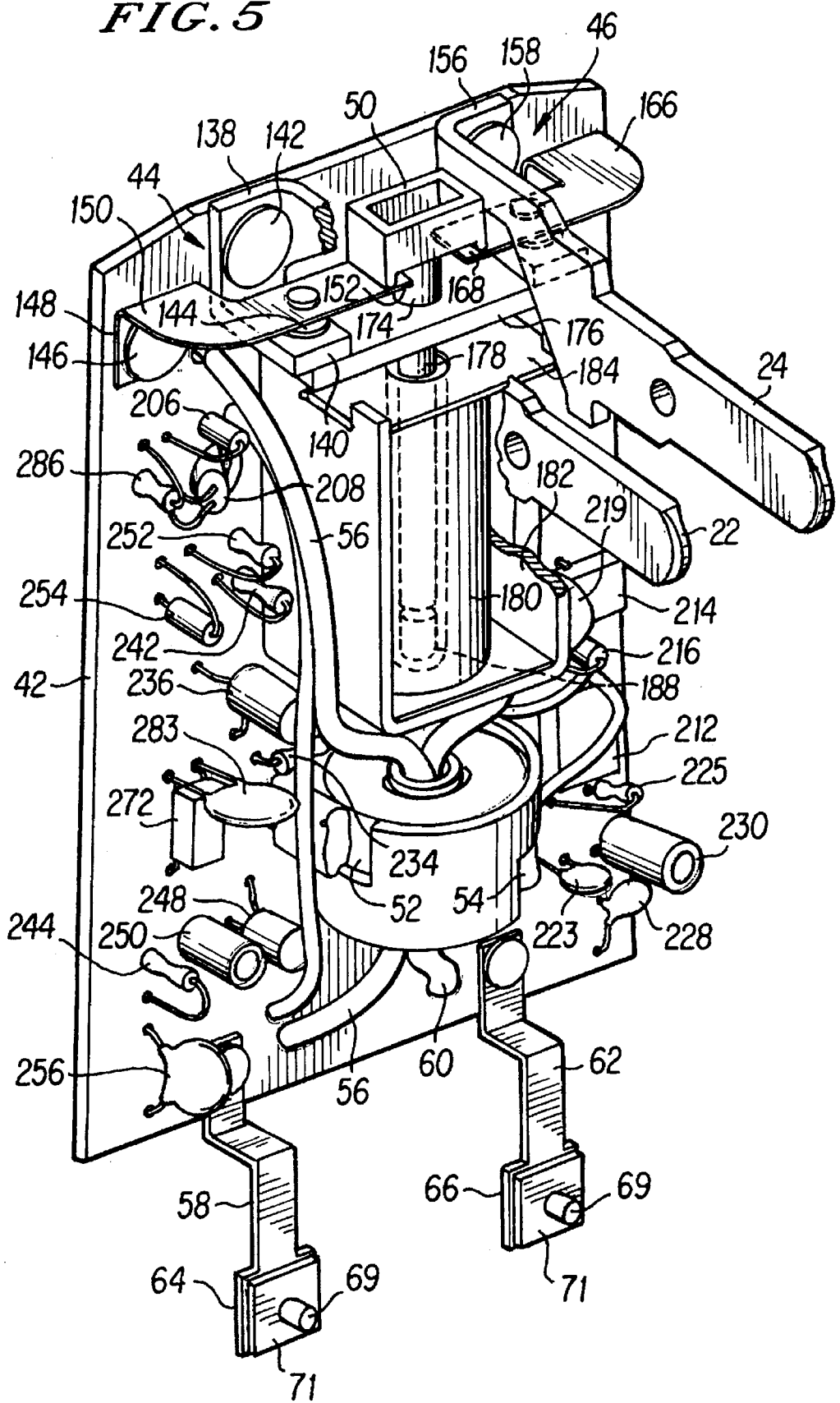
FIG. 5 is an enlarged perspective view of the circuit board used in the ground fault circuit interrupter plug of FIG. 1, illustrating the electrical components carried thereon.
Figure 6A:
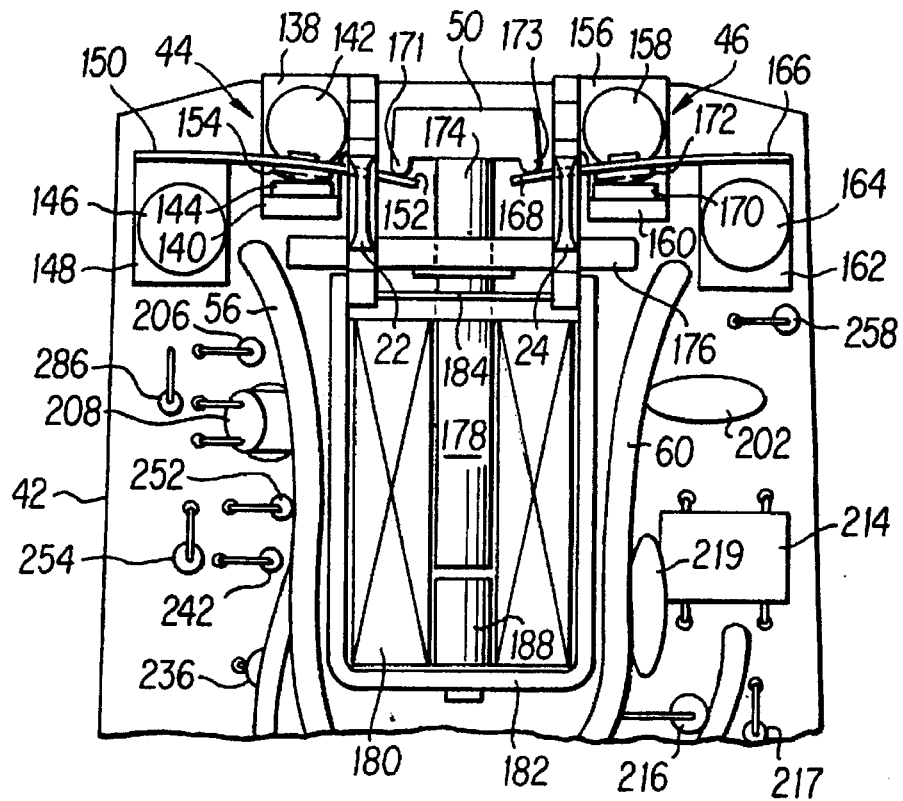
FIG. 6A is an elevational view of the upper portion of the circuit board of FIG. 5, illustrating the relay contact sets in the closed position.
Figure 6B:
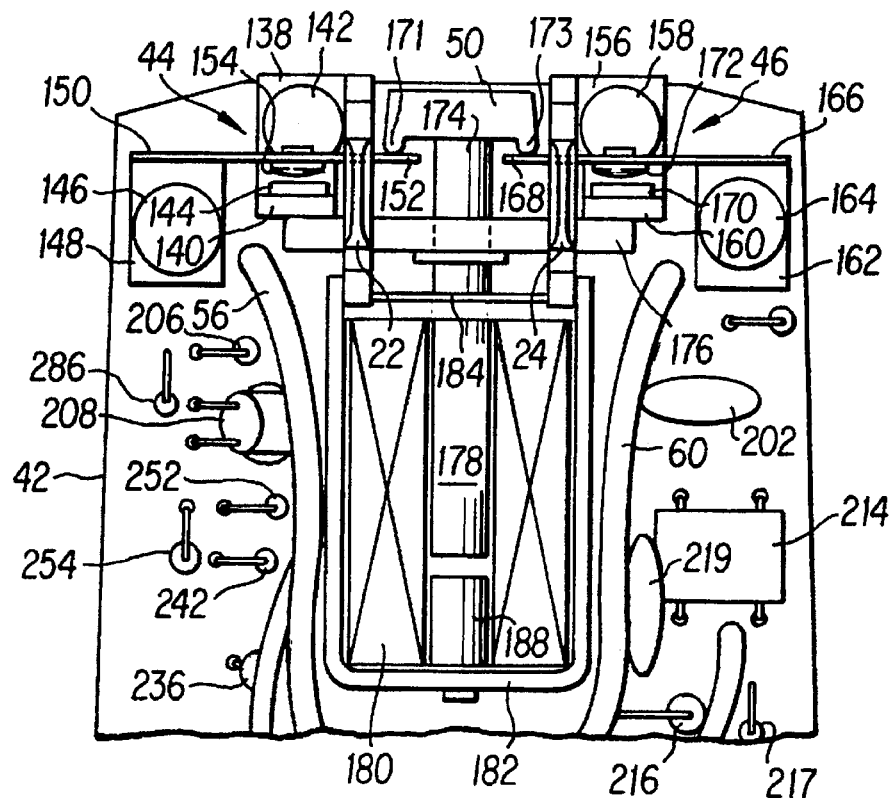
FIG. 6B is an elevational view similar to that of FIG. 6A, illustrating the relay contact sets in the open position.

FIG. 5 is an enlarged perspective view of the circuit board 42 of FIG. 3, shown removed from the front cover 14, and FIGS. 6A and 6B are elevational views of the upper portion of the circuit board 42 illustrating the closed and open positions, respectively, of the relay contact sets 44 and 46. These Figures illustrate two significant features of the GFCI plug 10, specifically, the novel construction of the relay contacts sets 44 and 46 and the space-saving layout of components on the circuit board 42. The two relay contacts sets 44 and 46 are substantially identical to each other, although the corresponding components of each are mirror images of each other to provide a symmetrical arrangement about the vertical midline of the circuit board 42 as shown in FIG. 5. Referring first to the relay contact set 44, a fixed contact is provided by means of a structure that is integral with the plug blade 22. This structure includes the plug blade 22 itself, an intermediate portion which is bent at an angle of approximately 90° to the plane of the plug blade 22, and a contact-bearing portion 140 which is bent at an angle of approximately 90° from the intermediate portion 138. The intermediate portion 138 is parallel to the plane of the circuit board 42 and is secured to the circuit board 42 by means of a rivet 142. The plane of the contact-bearing portion 140 is orthogonal to those of both the intermediate portion 138 and the plug blade 22, as shown, and extends outwardly in a direction normal to the plane of the circuit board 42. As will be evident, the plug blade 22, intermediate portion 138 and contact-bearing portion 140 may be formed from a continuous strip of metal that is bent at 90° along two fold lines. The contact-bearing portion 140 carries a disc-shaped electrical contact 144 on its upwardly-facing surface. Also attached to the circuit board 42, by means of a second rivet 146 located outside and slightly below the rivet 142, is a cantilevered spring arm having a base portion 148 and a resilient or deflectable portion 150. The base portion 148 is secured to the circuit board 42 by the rivet 146 and lies flat against the circuit board, and the resilient portion 150 is bent at an angle of 90° to the base portion so that it initially extends outwardly in a direction normal to the plane of the circuit board 42. The resilient portion 150 then bends through a 90° arc, as shown, so that its major portion extends toward the vertical midline of the circuit board 42 with its inner edge parallel to the plane of the circuit board 42 and its lower surface in overlying relationship with the contact-bearing portion 140 of the fixed contact structure. The resilient or deflectable portion 150 of the spring arm terminates in a free end 152 which is deflected upwardly and downwardly by the actuator 50 in a manner to be described shortly. At an intermediate point between the base portion 148 and free end 152, the deflectable portion 150 of the spring arm carries on its downwardly-facing surface a disc-shaped contact 154 which is positioned in a superimposed relationship with the upwardly-facing, disc-shaped contact 144 carried by the contact-bearing portion 140 of the fixed contact structure.

The construction of the relay contact set 46 is essentially identical to that described above, except that the components are reversed in a mirror-image manner. Integral with the plug blade 24 are an intermediate portion 156 which is affixed to the circuit board 42 by means of a rivet 158, and a contact-bearing portion 160 which is carried by the intermediate portion 156. The spring arm of the relay contact set 46 includes a base portion 162 which is secured to the circuit board 42 by means of a rivet 164, and a resilient or deflectable portion 166 which terminates in a free end 168, the latter being in contact with the bottom of the actuator 50. A disc-shaped contact 170 carried by the contact-bearing portion 160 of the fixed contact structure is positioned in opposed relationship with a similar disc-shaped contact 172 carried on the lower surface of the resilient or deflectable portion 166 of the spring arm.

The actuator 50 of FIGS. 5, 6A and 6B is formed with rounded, downwardly-extending ridges 171 and 173 which bear against the respective free ends 152 and 168 of the spring arms. The actuator 50 is part of a one-piece plastic structure which also includes a cylindrical spacer 174 and a horizontal bar-like lower stop member 176. The actuator 50, spacer 174 and stop member 176 are carried as a unit by the plunger 178 of a relay coil 180. The relay coil 180 is housed within a U-shaped metal frame 182 which, along with a corresponding metal cover 184, concentrates the magnetic flux lines within the core 180. When the coil 180 is energized by an electrical current (as will occur during normal operation of the GFCI plug 10 in the absence of a ground fault condition), the metal plunger 178 is attracted to a magnetic core piece 188 which is secured to the bottom of the metal frame 182 and projects upwardly for a short distance into the core of the coil 180. When this occurs, the actuator 50 is pulled downwardly as shown in FIG. 6A, thereby deflecting the resilient portions 150 and 166 of the spring arms to bring the upper relay contacts 154 and 172 into contact with the lower contacts 144 and 170. This closes both relay contact sets 44 and 46, and completes a circuit between each of the plug blades 22 and 24 and the corresponding output terminal 58 or 62. When current is removed from the relay coil 180, the plunger 178 and actuator 50 move upwardly under the restoring force of the resilient portions 150 and 166 of the spring arms, until these components assume the positions shown in FIG. 6B. In this condition, the upper relay contact discs 154 and 172 are separated from the lower relay contact discs 144 and 170, thereby opening both relay contact sets 44 and 46 and breaking the circuit between each plug blade 22 and 24 and its corresponding output terminal 58 or 62. It will be observed from FIG. 6B that the contact which occurs between the lower stop member 176 and the bottom surfaces of the contact-bearing portions 140 and 160 of the fixed contact structures limits the upward travel of the plunger 178 and actuator 50. This has a number of advantages. First, it helps to limit the size of the magnetic gap which can exist between the bottom of the plunger 178 and the top of the magnetic core piece 188, and thereby assures that the plunger 178 will respond properly when the relay coil 180 is energized. Secondly, by dimensioning the components in a manner such that the stop member 176 strikes the bottom surfaces of the contact-bearing portions 140 and 160 before the resilient portions 150 and 166 of the spring arms have deflected fully upward, a certain amount of preload force can be maintained on the spring arms when the relay contact sets 44 and 46 are in the open position shown in FIG. 6B. This maintains the actuator 50 in contact with the free ends 152 and 168 of the spring arms at all times, which sets the gap between the contact discs of each relay contact set 44 and 46 and provides more positive control over the movement of the spring arms.

As will be apparent from FIGS. 6A and 6B, the ridges 171 and 173 of the actuator 50 bear against the respective free ends 152 and 168 of the resilient portions 150 and 166 of the spring arms at a considerable distance from the locations of the upper contact discs 154 and 172. This allows for some degree of overtravel by the actuator 50 when the plunger 178 moves in the downward direction, in excess of the amount of travel actually needed to bring the upper contact discs 154 and 172 into contact with the lower contact discs 144 and 170. This is advantageous for at least two reasons. First, the overtravel produces an additional degree of deflection of the resilient portions 150 and 166 of the spring arms in the regions between the upper contact discs 154, 172 and the free ends 152, 168. This additional deflection increases the closing or holding force that is applied between the upper contact discs 154, 172 and the lower contacts discs 144, 170. The second advantage is that, in the event that the gaps between the line side contact discs 144, 154 and the neutral side contact discs 170, 172 are different when the relay contact sets 44 and 46 are in the open position of FIG. 6B, the overtravel of the actuator 50 will tend to compensate for this difference and insure that both sets of contacts are fully closed.

Other advantages of the present invention will also be apparent from FIGS. 5, 6A and 6B. For example, the relay contact sets 44 and 46 are relatively compact in construction, requiring only a small amount of space near the upper end of the printed circuit board 42. Both the fixed and movable contact structures of each relay contact set 44, 46 are mounted directly to the printed circuit board 42, an arrangement which is considerably simpler and more compact than the alternative of mounting a self-contained DPST relay on the circuit board 42. Finally, the cost and complexity of the relay contact sets 42 and 46 is further reduced by forming the fixed contact structures 138, 140 and 156, 160 integrally with the respective plug blades 22 and 24. In other circumstances, this latter feature might be disadvantageous in that deflection of the plug blades 22 and 24 (which typically occurs in a horizontally inward or outward direction) might result in movement of the contact-bearing portions 140 and 160 of the fixed contact structures. In the illustrated embodiment, however, the potting compound 30 of FIG. 2 substantially prevents any deflection of the plug blades 22 and 24 from being transmitted to the corresponding contact-bearing portions 140 and 160. The mechanical locations of the rivets 142 and 158 at intermediate points between the plug blades 22 and 24 and the contact-bearing portions 140 and 160 also tends to isolate the contact-bearing portions 140, 160 from any deflection of the plug blades 22, 24. Moreover, even if the plug blades 22 and 24 are deflected in a horizontally inward or outward direction, and this deflection is transmitted to some extent to the contact bearing portions 140 and 160, the fact that the planes of the contact-bearing portions 140 and 160 are parallel to the direction of deflection means that the gap between the respective pairs of contact discs 144, 154 and 170, 172 will not be affected. In general, this will be true whenever the planes of the contact-bearing portions 140 and 160 are orthogonal to the planes of the plug blades 22, 24 and parallel to the direction in which the plug blades 22, 24 are deflected.

As can be appreciated from FIG. 5, the principal components of the GFCI plug 10 are arranged in a tandem or in-line manner on the circuit board 42, with the plug blades 22, 24 at the top, the output terminals 58, 62 at the bottom, and the relay contact sets 44, 46, the relay coil 180 and the toroidal transformers 52, 54 arranged linearly in between. This arrangement is relatively compact and provides spaces on either side of the circuit board 42 for the resistors, capacitors, integrated circuits and other electrical components required to detect ground fault conditions and control the energization and de-energization of the relay coil 180. A particularly advantageous arrangement, which is employed in the illustrated embodiment, is to mount power supply components on the upper portion of the circuit board 42 (near the relay coil 180 and relay contact sets 44, 46), and to mount integrated circuits and other sensitive components on the lower part of the circuit board 42 to isolate them from interference caused by the operation of the relay coil 180 and relay contact sets 44, 46. In FIGS. 5, 6A and 6B, the electrical components carried by the circuit board 42 are individually designated to correspond with reference numerals used in the schematic diagrams of FIGS. 7 and 8, so that the preferred positions of the components will be apparent.

Figure 7:
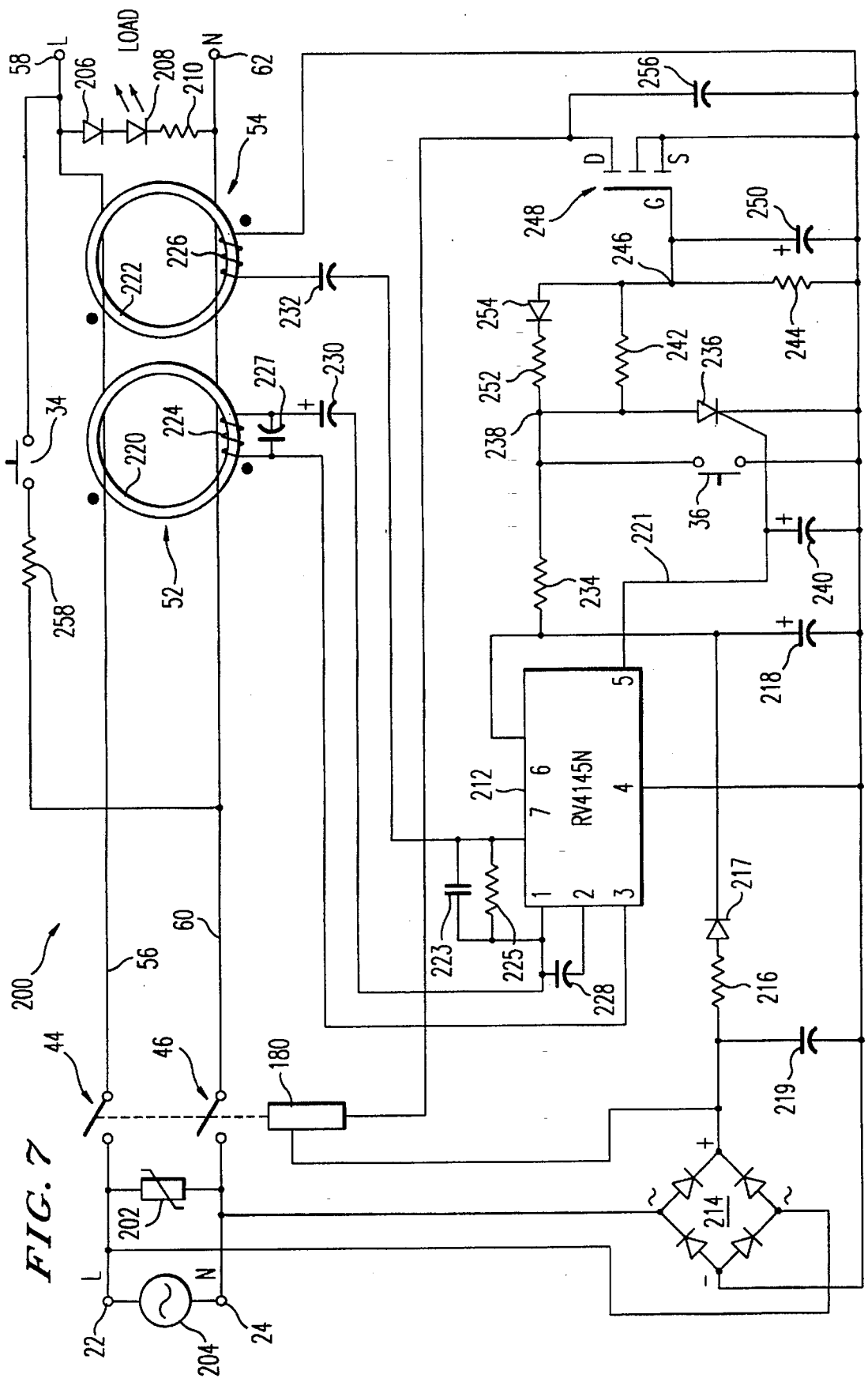
FIGS. 7 and 8 are schematic diagrams of two different electrical circuits which may be used in the ground fault circuit interrupter plug of FIGS. 1–6.
Figure 8:
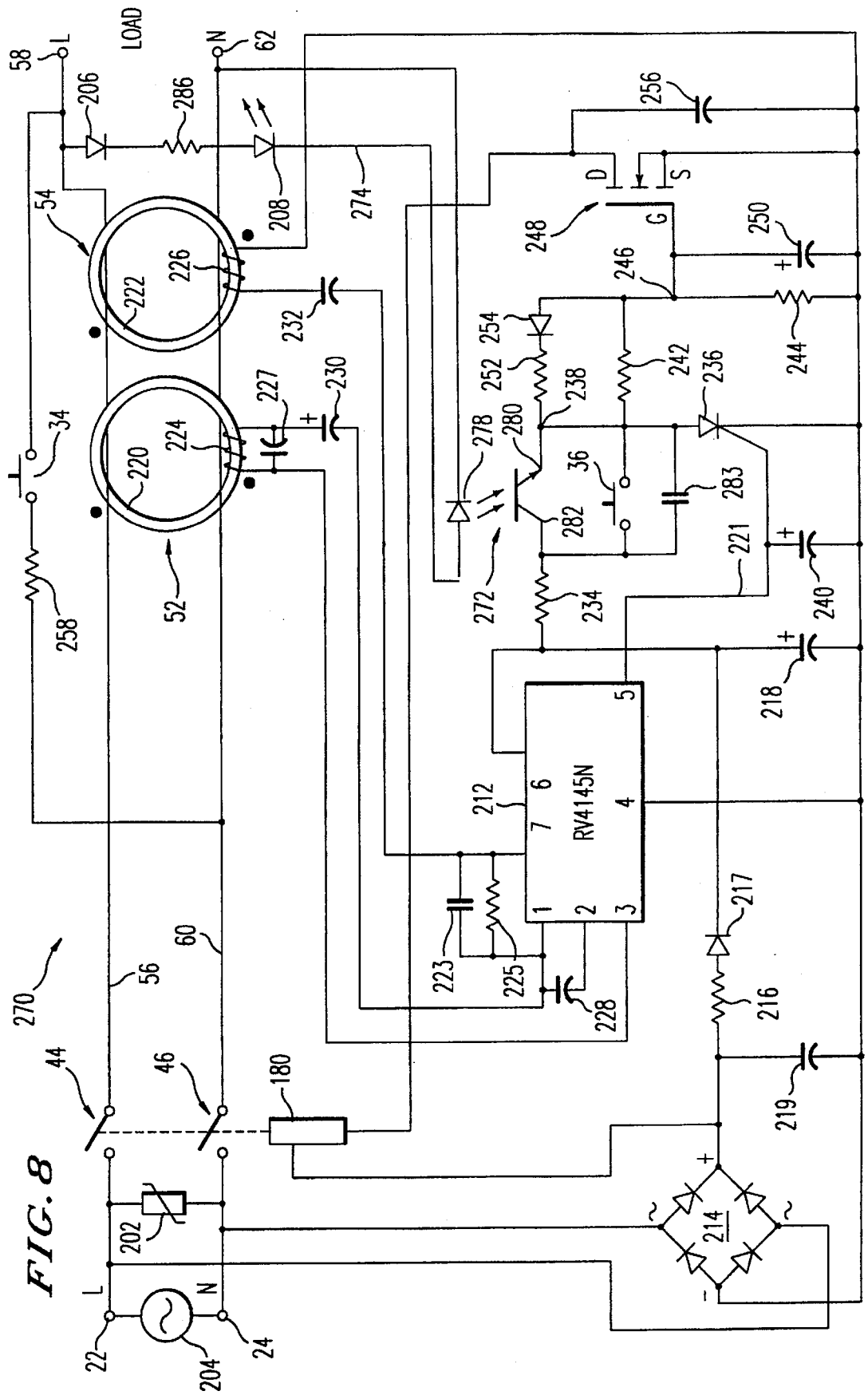

FIGS. 7 and 8 are schematic diagrams of two alternative electrical circuits which can be employed in the GFCI plug 10 of FIGS. 1–6. The circuit of FIG. 7 incorporates an automatic set feature, in which the relay contact sets 44 and 46 are closed automatically whenever power is applied to the AC input terminals. The circuit of FIG. 8, on the other hand, requires manual setting to close the relay contact sets 44 and 46 when the GFCI plug 10 is initially connected to an AC receptacle, or after a power supply interruption.

Referring first to FIG. 7, the automatically set circuit 200 includes a pair of input terminals 22 and 24 which corresponds to the plug blades of the GFCI plug 10. The line input terminal 22 is connected through the relay contact set 44 to the line conductor 56, and the neutral input terminal 24 is connected through the relay contact set 46 to the neutral conductor 60. The line and neutral conductors 56 and 60 are connected to the output terminals 58 and 62, respectively. A transient voltage suppressor 202 is connected across the input terminals 22 and 24 to provide protection from voltage surges due to lightning and other transient conditions. The output terminals 58 and 62 are connected, respectively, to the line and neutral input terminals of an AC load (not shown) through the line cord 40 of FIG. 1. The conductive paths established by the conductors 56 and 60 are selectively made and broken by the first and second relay contact sets 44 and 46, respectively, in order to selectively connect and disconnect the input terminals 22 and 24 from the output terminals 58 and 62. The relay contact sets 44 and 46 are operated simultaneously by the AC relay coil 180. Energization of the relay coil 180 causes both relay contact sets 44 and 46 to be held in the position shown in FIG. 6A, thereby establishing continuous conductive paths between the input terminals 22, 24 and the output terminals 58, 62 and delivering power from the AC source 204 to the load. When the relay coil 180 is de-energized, the relay contact sets 44 and 46 are both moved to the open position shown in FIG. 6B, thereby interrupting the conductive paths 56 and 60 and removing AC power from the load. The relay coil 180 is de-energized in response to the detection of a ground fault condition, in a manner to be described below, and prevents an electrical shock hazard by immediately and simultaneously removing power from both sides of the AC load when such a condition is detected.

When the relay contact sets 44 and 46 are in the closed position, the AC line and neutral conductors 56 and 60 are connected across a shunt path comprising a diode 206, LED 208 and current limiting resistor 210. Illumination of the LED 208, which is visible through the lens 38 of FIG. 1, provides a visual indication that the relay contact sets 44 and 46 are closed and that power is available from the AC source 204. When the occurrence of a ground fault condition causes the relay contact sets 44 and 46 to open, the LED 208 is no longer illuminated. If desired, a neon bulb may be substituted for the LED 208.

The detection of a ground fault condition is implemented by a current sensing circuit which comprises the two transformers 52 and 54, a commercially available GFCI controller 212, and various interconnecting components. The GFCI controller 212 is preferably Type RV4145N integrated circuit manufactured by the Semiconductor Division of Raytheon Company, located in Mountain View, Calif. The GFCI controller 212 is powered from the AC input terminals 22 and 24 by means of a full-wave power supply comprising a diode bridge 214, a current limiting resistor 216 and a filter capacitor 218. The positive output of the diode bridge 214 is also connected to one side of the relay coil 180, and a diode 217 prevents the capacitor 218 from discharging through the relay coil 180. A capacitor 219 provides noise filtering across the outputs of the diode bridge 214. The line and neutral conductors 56 and 60 pass through the magnetic cores 220 and 222 of the transformers 52 and 54, as shown, with the secondary coil 224 of the transformer 52 being connected to the input of the GFCI controller 212 and the secondary coil 226 of the transformer 54 being connected between the GFCI controller 212 and the negative output terminal of the diode bridge 214. The transformer 52 serves as a differential transformer for detecting a connection between the line side of the AC load and an earth ground (not shown), while the transformer 54 serves as a grounded neutral transformer for detecting a connection between the neutral side of the AC load and an earth ground. In the absence of a ground fault, the currents flowing through the conductors 56 and 60 will be equal and opposite, and no net flux will be generated in the core 220 of the differential transformer 52. In the event that a connection occurs between the line side of the AC load and ground, however, the current flowing through the conductors 58 and 60 will no longer precisely cancel and a net flux will be generated in the core 220 of the transformer 52. This flux will give rise to a potential at the output of the secondary coil 224, and this output is applied to the inputs of the GFCI controller 212 to produce a trip signal on the output line 221. If the ground fault condition results from the neutral side of the AC load accidentally being connected to ground, a magnetic path is established between the differential transformer 52 and the grounded neutral transformer 54. When this occurs, a positive feedback loop is created around an operational amplifier within the GFCI controller 212, and the resulting oscillations of the amplifier will likewise give rise to the trip signal on line 221.

Since the GFCI controller 212 is a commercially available component, its operation is well known and need not be described in detail. In utilizing this device, a resistor 225 serves as a feedback resistor for setting the gain of the controller and hence its sensitivity to normal faults, and a capacitor 223 in parallel with the resistor 225 provides noise filtering. Capacitors 227 and 228 provide noise filtering at the inputs of the controller, and capacitor 230 provides AC input coupling. Capacitor 232 serves as a portion of the oscillatory circuit for the grounded neutral transformer 54.

In the absence of a ground fault condition, no output is produced by the GFCI controller 212 on line 221. Under these circumstances, current flows from the full-wave power supply formed by the diode bridge 214, resistor 216 and filter capacitor 218 and then passes through a trip circuit to provide a control signal input to a further circuit which controls the energization of the relay coil 180. The trip circuit comprises a limiting resistor 234 connected to the positive terminal of the filter capacitor 218, a momentary normally-open pushbutton switch 36 corresponding to the RESET switch 36 of FIG. 1, and a switching or shunting circuit in the form of a silicon controlled rectifier (SCR) 236 having its anode connected to the resistor 234 and its cathode connected to the negative output of the diode bridge 214. The node 238 between the resistor 234 and the anode of the SCR 236 serves as the output of the trip circuit and the input to a biasing and control circuit for the relay coil 180. The gate of the SCR 236 is connected to the output line 221 of the GFCI controller 212. A capacitor 240 is connected between the gate of the SCR 236 and the negative output of the diode bridge 214 to serve as a filter for preventing narrow noise pulses from triggering the SCR. In the absence of a gating signal on line 221, the SCR 236 does not conduct and current from the full-wave power supply 214, 216, 218 passes through the resistor 234 to serve as a control signal for energizing the relay coil circuit in a manner to be described shortly. When a ground fault condition occurs, however, the GFCI controller 212 causes the output line 221 to go high, thereby gating the SCR 236 into conduction, shorting the resistor 234 directly to the negative output of the diode bridge 214, and thus removing the control signal from the input of the relay coil circuit. Removal of the control signal from the relay coil circuit causes the relay coil 180 to become de-energized, thereby opening the relay contact sets 44 and 46 and removing AC power from the load or output terminal 58 and 62.

As is well known, an SCR will continue to conduct as long as current flows between its anode and cathode, even after the gating signal is removed. Thus, the SCR 236 will continue to maintain the relay coil 180 in a de-energized condition, and the contact sets 44 and 46 open, even after the ground fault condition has disappeared and the output of the GFCI controller 212 on line 221 has been restored to a zero voltage level. Thus, the operation of the circuit 200 is similar to that of a GFCI device employing a mechanical circuit breaker, in that disappearance of the ground fault condition does not restore power to the AC load until a manual reset button is pushed. In the circuit of FIG. 7, momentary depression of the RESET pushbutton 36 will create a short circuit across the anode and cathode of the SCR 236, causing the SCR 236 to stop conducting current. When the RESET pushbutton 36 is released, the SCR 236 will remain in a non-conducting state in the absence of a new gating signal. This restores the control signal to the relay coil circuit and re-energizes the relay coil 180, thereby closing the relay contact sets 44 and 46 and restoring AC power to the load or output terminals 58 and 62.

As noted previously, the node 238 between the resistor 234 and the anode of the SCR 236 corresponds to the input of a circuit which controls the energization of the relay coil 180. This circuit includes resistors 242 and 244, which are connected in series between the node 238 and the negative output of the diode bridge 214 to form a voltage divider. The node 246 between the two resistors is connected to the gate (G) input of a metal-oxide-semiconductor field effect transistor (MOSFET) 248, and the source (S) terminal of the MOSFET 248 is connected to the negative output of the diode bridge 214. The drain (D) terminal of the MOSFET 248 is connected to one side of the relay coil 180, and the opposite side of the relay coil 180 is connected to the positive output of the diode bridge 214 as noted previously. Thus, when the MOSFET 248 is gated into conduction, AC current will flow through the relay coil 180 and maintain the relay contact sets 44 and 46 in a closed position. When the relay coil 180 is de-energized by rendering the MOSFET 248 nonconductive, the relay contact sets 44 and 46 will open to remove power from the AC load.

The gating of the MOSFET 248 in the relay coil circuit is controlled by the voltage at the node 246 between the voltage divider resistors 242 and 244, and this voltage will in turn depend upon the presence of the control signal at the input node 238 of the relay coil circuit as determined by the state of the SCR 236 of the trip circuit. The values of voltage divider resistors 242 and 244 are chosen so that the proper gate voltage is applied to the MOSFET 248 when the control signal is present. A filter capacitor 250 is connected between the gate terminal of the MOSFET 248 and the negative output of the diode bridge 214, in order to prevent the MOSFET 248 from being gated by noise pulses. A resistor 252 and diode 254 allow the capacitor 250 to discharge quickly when the SCR 236 goes into conduction, thereby allowing for a rapid turn-off of the MOSFET 248. A capacitor 256 is connected between the drain and source terminals of the MOSFET 248 in order to prevent the MOSFET 248 from being triggered into conduction by rapid changes in the drain-to-source voltage, a phenomenon known as dV/dT triggering.

In addition to the RESET switch 36, a second normally-open momentary pushbutton switch 34 is provided to allow the user to test the operation of the GFCI plug 10. The TEST switch 34 is connected in series with a current limiting resistor 258, and the series connection of the switch 34 and resistor 258 is connected between the AC line conductor 56 on the load side of the transformers 52 and 54, and the AC neutral conductor 60 on the supply side of the transformers 52 and 54. When the TEST switch 34 is momentarily depressed, sufficient current will flow through the resistor 258 to cause an imbalance in the current flowing through the primary coil of the transformer 52. This will simulate a ground fault condition, causing the GFCI controller 212 to produce an output signal on line 221 that de-energizes the relay coil 180 by rendering the SCR 236 conductive and the MOSFET 248 nonconductive. The relay contact sets 44 and 46 will open, and can be closed again by depressing the RESET switch 36. If this sequence of events does not occur, the user will be alerted to the fact that the GFCI plug 10 is defective and requires repair or replacement.

FIG. 8 is schematic diagram a modified circuit 270 for the GFCI plug 10 which incorporates a manual set feature. Except for the manual set feature, the circuit of FIG. 8 is similar to that of FIG. 7 and the components thereof have been correspondingly numbered. The manual set feature, which is described in the aforementioned copending patent application of Thomas M. McDonald, Ser. No. 08/115,020, requires the GFCI plug 10 to be manually set by depressing the RESET switch 36 when the GFCI plug 10 is initially connected to the AC power supply 204, or after an interruption in the supplied AC power. This is achieved, in part, by means of a controlled switching device 272, which is placed in series between the resistor 234 and node 238, as illustrated in FIG. 8, in order to selectively apply the control signal from the trip circuit to the voltage divider resistors 242 and 244 of the relay coil circuit. In the illustrated embodiment, the controlled switching device 272 comprises an opto-isolator 272. The input or control terminals 274 and 276 of the opto-isolator 272 are connected to an internal light-emitting diode (LED) 278 which permits current to flow between the output terminals 280 and 282 of the opto-isolator when the LED 278 is forward-biased. In the circuit of FIG. 8, the input terminals 274 and 276 of the opto-isolator are connected across the load or output terminals 58 and 62 of the GFCI plug 10 in order to form a load power sensing circuit for detecting the availability of AC power at the load terminals. The diode 206 is placed in series between the AC line output terminal 58 and the positive opto-isolator input terminal 274 to limit the reverse-bias potential across the LED 278. A resistor 286 is placed in series between the diode 284 and the LED 278 to limit the current flow through the LED 278. The LED 208 of FIG. 7 (which may be replaced by a neon bulb if desired) is placed in series between the resistor 286 and LED 278 in the circuit of FIG. 8, and is illuminated whenever AC power is available at the load terminals 58 and 62. The momentary pushbutton switch 36 is connected across the output terminals 280 and 282 of the opto-isolator 272 as shown. The momentary pushbutton switch 36 is normally open and, when depressed, establishes a short circuit between the resistor 234 and the node 238 in order to bypass the opto-isolator 272. A capacitor 283 is connected in parallel with the switch 36, as shown.

In the absence of a ground fault condition, the control signal current flowing from the resistor 234 passes through the opto-isolator 272 to the node 238 and voltage divider resistors 242 and 244, thereby rendering the MOSFET 248 conductive and energizing the relay coil 180 in order to maintain the relay contact sets 44 and 46 in the closed position. With the relay contact sets 44 and 46 closed, current from the AC power source 204 flows through the diode 284, resistor 286 and LEDs 208 and 278, thereby providing a load power signal which maintains the opto-isolator 272 in a conductive state whenever power is being made available at the load terminals 58 and 62. (The opto-isolator 272 actually conducts only during the positive half-cycles of the AC potential at the load terminals 58 and 62, but the capacitor 250 is of sufficient size to maintain the MOSFET 248 in conduction during the brief intervals in which the opto-isolator 272 is not conducting.) When a ground fault condition is detected by the GFCI controller 212, the MOSFET 248 becomes nonconductive when the SCR 236 is gated into conduction, and de-energizes the relay coil 180. This causes the relay contact sets 44 and 46 to open, thereby removing power from both sides of the AC load. The opening of the relay contact sets 44 and 46 also removes power from the input terminals 274 and 276 of the opto-isolator 272, thereby causing the opto-isolator 272 to become nonconductive and the SCR 236 to turn off. Termination of the ground fault condition will not reset the GFCI plug 10, since current cannot flow to the relay coil 180 until the opto-isolator 272 has been restored to a conducting state. Reset is accomplished by momentarily depressing the RESET switch 36, which bypasses the opto-isolator 272 and permits current to flow through the relay coil 180 for a period sufficient to close the relay contact sets 44 and 46. As soon as these contact sets are closed, power is again applied to the input terminals 274 and 276 of the opto-isolator 272, which places the opto-isolator 272 into conduction. The RESET button 36 can then be released without causing the relay contact sets 44 and 46 to open. The capacitor 283 assists in holding the opto-isolator 272 in conduction during this interval. Since the ground fault condition has been terminated, the SCR 236 is no longer being gated by the output 221 of the GFCI controller 212, and hence the current flowing through the RESET switch 36 or opto-isolator 272 is not shunted to the negative output of the diode bridge 214. However, if reset is attempted while the ground fault condition is still in effect, the SCR 236 will begin conducting since it is still receiving a gating signal from the GFCI controller 212. Therefore, the current passing through the RESET switch 36 or opto-isolator 272 will be shunted directly to the negative output of the diode bridge 214 by the SCR 236, and the potential on node 238 will be insufficient to energize the relay coil 180.

The manner in which the GFCI circuit 270 of FIG. 8 provides a manual set feature following initial connection to an AC power supply, or termination of a power supply interruption, will now be evident. Since the input terminals 274 and 276 of the opto-isolator 272 are connected (via the diode 284, resistor 286 and LED 208) to the line and neutral conductors 56 and 60 on the load side of the relay contact sets 44 and 46, they will not be energized unless power is being supplied by the AC source 204 and the contact sets 44 and 46 are closed. The contact sets 44 and 46, in turn, cannot close until current is initially provided to the relay coil 180 by operating the RESET switch 36 to place the opto-isolator 272 into conduction. In other words, after the plug blades 22 and 24 of the GFCI plug 10 are initially connected to an AC receptacle, AC power will not appear at the output terminals 58 and 62 until the RESET pushbutton 36 is depressed momentarily. Similarly, an interruption in the AC power from the source 204 will remove power from the output terminals 58 and 62 by de-energizing the relay coil 180 for a period sufficient to allow the contact sets 44 and 46 to open, and this will cause the opto-isolator 272 to become nonconductive. Power will not be restored until the RESET switch 36 is momentarily depressed to close the contact sets 44 and 46, and thereby return the opto-isolator 272 to a conductive state. In both of the situations just described (i.e., initial connection to an AC power source and temporary interruption of the AC power source), the LED 208 will not illuminate until AC power is made available at the load or output terminals 58 and 62. Thus, non-illumination of the LED 208 serves not only to indicate that a ground fault condition has occurred, as in the circuit of FIG. 7, but also indicates when manual setting of the GFCI plug 10 is needed in order to provide AC power to the output terminals 58 and 62.

The opto-isolator 272 of FIG. 8 may take a variety of forms. In the embodiment shown, the portion of the opto-isolator 272 through which the controlled current flows comprises a phototransistor, with the output terminals 280 and 282 comprising the collector and emitter terminals, respectively, of the phototransistor. In other embodiments, however, this portion of the opto-isolator may comprise a thyristor, such as a silicon controlled rectifier (SCR) or a triac, or a field-effect transistor (FET). Any of these devices may be employed in place of the opto-isolator 272 shown in FIG. 8. The desirable feature of all of these devices is that they provide electrical isolation between the load or output terminals 58 and 62 and the internal control circuitry of the GFCI plug 10. Thus, a failure or defect in the internal circuitry of the GFCI plug 10 cannot cause the load terminals 58 and 62 to become connected to the AC source 204 when the relay contact sets 44 and 46 are in the open position. This is a desirable safety feature in a GFCI device. Other methods for achieving the desired isolation, including the use of relays and transformer-gated triacs, are disclosed in the aforementioned copending application of Thomas M. McDonald, Ser. No. 08/115,020, which is incorporated herein by reference. Also disclosed in the copending application is a further modification in which the RESET switch 36 is relocated so that it restores the opto-isolator 272 to a conductive state not by temporarily bypassing the output terminals of the opto-isolator, as in FIG. 8, but instead by temporarily energizing the input terminals 274 and 276 of the opto-isolator 272 from the AC input terminals 22 and 24.

Preferred values for the electrical components used in the GFCI circuits 200 and 270 of FIGS. 7 and 8 are provided in Table 1 below. Resistor values are expressed in ohms (Ω), kilohms (K) or megohms (M). All resistors are ¼-watt unless otherwise noted. Capacitor values are expressed in microfarads (µF) or picofarads (pF).

TABLE 1

| Component | Value or Type |
| --- | --- |
| Resistors 215, 258 | 15K |
| Diodes 206, 214, 217, 254 | 1N4005 |
| LED 208 | Red (or neon bulb) |
| Resistor 210 | 47K |
| Resistor 216 | 15K (2 watts) |
| Capacitors 218, 240, 250 | 3.3 µF |
| Capacitor 219 | 0.01 µF (500 volts min.) |
| Capacitor 223 | 22 pF (50 volts) |
| Resistor 225 | 1.0M |
| Capacitor 227 | 0.01 µF |
| Capacitor 228 | 0.001 µF |
| Capacitor 230 | 10 µF (50 volts) |
| Capacitor 232 | 0.0 µF |
| Resistor 234 | 2200 Ω |
| SCR 236 | Teccor EC103 |
| Resistors 242, 244 | 22K |
| MOSFET 248 | Siliconix VN50300L |
| Resistor 252 | 22 Ω |
| Capacitor | 0.0022 µF (500 volts min.) |
| Resistor 258 | 15K |
| Opto-isolator 272 | 4N36 or KPC PC17T1 |
| Resistor 286 | 27K (½ Watt), or 47K for neon bulb |
| Capacitor 283 | 0.1 µF (25 volts) |

Figure 9A:
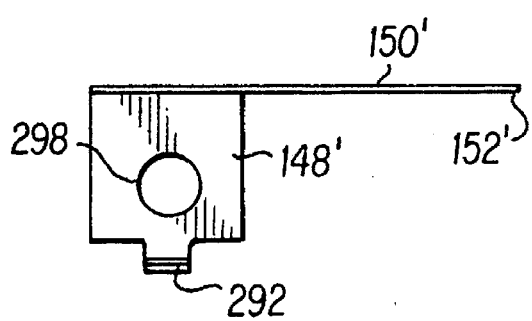
FIGS. 9A, 9B and 9C are front, side and bottom views of a modified construction which may be used for the spring arm of each relay contact set in the GFCI plug 10 of FIG. 1.
Figure 9B:
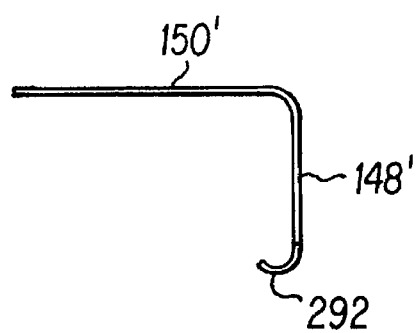
Figure 9C:
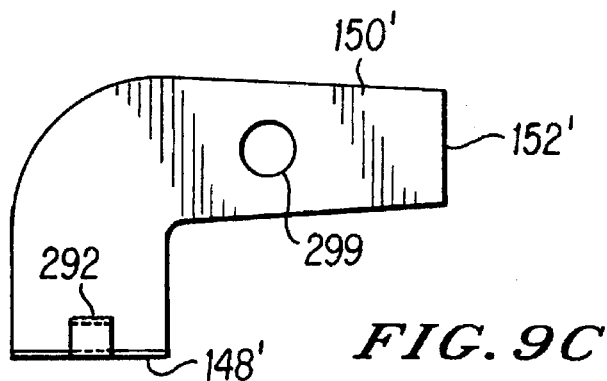

FIGS. 9A, 9B and 9C illustrate a modified construction for the spring arm 148, 150 of FIGS. 5, 6A and 6B, and FIG. 10 illustrates a modified circuit board configuration which may be used with this spring arm construction. It will be understood that a similar modification may be employed for the second spring arm 162, 166 of FIGS. 5, 6A and 6B. In the modification, the base portion 148' of the spring arm lies along the rear surface of the circuit board 42 rather than along the front surface as shown in FIG. 5. The resilient or deflectable portion 150' of the spring arm passes through a horizontal slot 290 formed near the upper left-hand corner of the circuit board 42, and overlies the contact-bearing portion 140 of the fixed contact structure as in the embodiment of FIGS. 5, 6A and 6B. At the lower end of the base portion 148', a semicircular tab or retainer 292 is formed and passes through an elongated hole 294 in the circuit board 42 located below the slot 290. During assembly, the gripping force exerted between the slot 290 and hole 294 by the deflectable portion 150' and tab 292 holds the spring arm in place on the circuit board 42. As in the embodiment of FIGS. 5, 6A and 6B, a rivet 146 is then inserted through a hole 296 in the circuit board and through a corresponding hole 298 in the base portion 148' of the spring arm to permanently affix the spring arm 148', 150' to the circuit board 42. During wave soldering of the circuit board 42, solder is applied to the base portion 148' and to an underlying contact pad on the reverse (printed) side of the circuit board 42, which further secures the spring arm 148', 150' to the circuit board 42.

Figure 10:
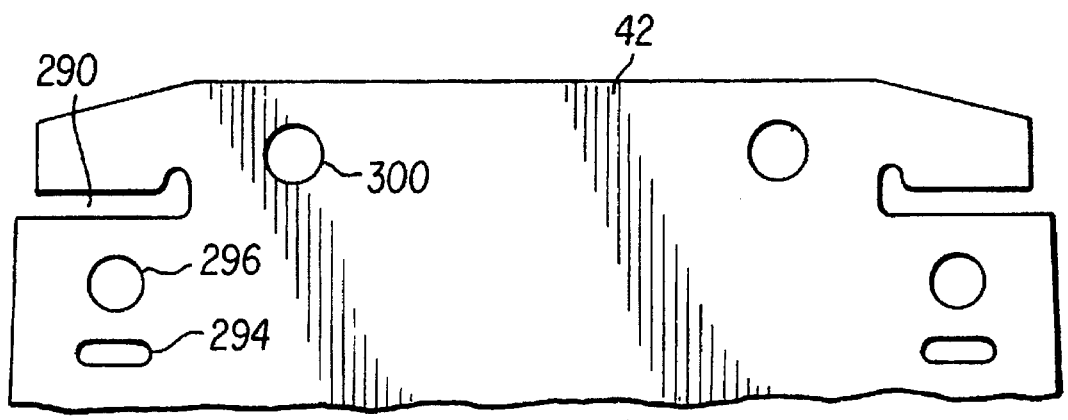
FIG. 10 is an elevational view of the upper portion of a modified printed circuit board which is designed to accommodate the spring arm shown in FIGS. 9A, 9B and 9C.

The embodiment of FIGS. 9A, 9B, 9C and 10 is advantageous in that rotation of the spring arm 148', 150' about the axis of the rivet 146 of FIG. 5, 6A and 6B is prevented by the engagement of the deflectable portion 150' with the slot 290 and by the engagement of the tab or retainer 292 with the elongated hole 294. Such rotation, which can otherwise occur with repeated deflection of the Spring arm by the actuator 50, is undesirable because it can alter the gap between the contact discs 144 and 154 in FIGS. 5, 6A and 6B. As in the embodiment of FIGS. 5, 6A and 6B, a hole 299 is provided in the resilient or deflectable portion 150' of the spring arm to allow attachment of the upper contact disc 154. The tapered profile of the resilient or deflectable portion 150' as shown in FIG. 9C is also shared with the embodiment of FIG. 5, and is advantageous in reducing the deflection force needed to close the relay contact set 44. Also visible in FIG. 10 is the hole 300 that is formed near the upper edge of the circuit board 42 for receiving the rivet 142 of FIGS. 5, 6A and 6B.

While only a limited number of exemplary embodiments have been chosen to illustrate the present invention, it will be understood by those skilled in the art that various changes and modifications can be made therein. For example, the housing of the GFCI plug 10 may be provided with one or more female AC outlets for accommodating the male plugs of AC load devices, in addition to (or on lieu of) the line cord 40. These and other changes or modifications are intended to fall within the spirit and scope of the invention as defined in the appended claims.

What is claimed is:

1. A ground fault circuit interrupter plug comprising:
   a housing having a pair of plug blades for connection to an AC receptacle and a pair of output terminals for connection to an AC load;
   a circuit board within said housing; and
   electrical circuitry carried by said circuit board for providing ground fault protection to an AC load connected to said output terminals, said electrical circuitry including:
      a relay comprising a relay coil and a pair of relay contact sets operated by said relay coil for selectively connecting and disconnecting said plug blades and said output terminals, each of said relay contact sets comprising a fixed contact structure mounted to said circuit board and a movable contact structure mounted to said circuit board; and
      an electronic circuit coupled to said relay coil for maintaining said relay contact sets in a closed position to connect said plug blades to said output terminals in the absence of a ground fault condition, and for causing said relay contact sets to move to an open position to disconnect said plug blades from said output terminals in response to a ground fault condition.

2. A ground fault circuit interrupter plug as claimed in claim 1, wherein said relay further comprises a movable plunger for actuating said relay contact sets, said plunger and said relay coil being oriented with their axes substantially parallel to the surface of said circuit board, and further wherein said fixed and movable contact structures lie in planes that are substantially orthogonal to the surface of said circuit board and normal to the axes of said plunger and said relay coil.

3. A ground fault circuit interrupter plug as claimed in claim 1, wherein said movable contact structure is normally biased out of contact with said fixed contact structures, and wherein said relay further comprises an actuator controlled by said relay coil for overcoming said bias and moving said movable contact structure into contact with said fixed contact structure.

4. A ground fault circuit interrupter plug as claimed in claim 1, wherein said plug blades and said output terminals are provided at generally opposite ends of said housing.

5. A ground fault circuit interrupter plug as claimed in claim 1, wherein said output terminals comprise screw terminals located within said housing for connection to an AC line cord.

6. A ground fault circuit interrupter plug as claimed in claim 1, wherein said electrical circuitry further comprises a pair of line and neutral conductors for connecting said plug blades to said output terminals through said relay contact sets and at least one sensing transformer through which said line and neutral conductors pass for sensing a current imbalance in said conductors that is indicative of a ground fault condition, and wherein said relay contact sets, said relay coil and said sensing transformer are mounted on said circuit board in a generally tandem arrangement.

7. A ground fault circuit interrupter plug as claimed in claim 6, wherein additional components of said electrical circuitry are mounted on said circuit board along at least one side of said generally tandem arrangement of said relay contact sets, said relay coil and said sensing transformer.

8. A ground fault circuit interrupter plug as claimed in claim 1, wherein said fixed contact structure is integral with one of said plug blades.

9. A ground fault circuit interrupter plug as claimed in claim 8, wherein said fixed contact structure and said plug blade are formed from a continuous strip of metal that is secured at an intermediate point to said circuit board, with the portion of said strip on one side of said intermediate point forming said fixed contact structure and the portion of said strip on the other side of said intermediate point forming said plug blade.

10. A ground fault circuit interrupter plug as claimed in claim 9, wherein the portion of said strip forming said fixed contact structure lies in a plane that is substantially orthongonal to the plane of said plug blade and parallel to the longitudinal axis of said plug blade.

11. A ground fault circuit interrupter plug as claimed in claim 1, wherein said movable contact structure comprises a cantilevered spring arm having one end secured to said circuit board and a free end opposite to said secured end.

12. A ground fault circuit interrupter plug as claimed in claim 11, wherein said actuator bears on the free end of said spring arm in order to deflect said spring arm into contact with said fixed contact structure, and wherein said spring arm includes a contact portion located at an intermediate point between said free end and said secured end for contacting said fixed contact structure during such deflection.

13. A ground fault circuit interrupter plug as claimed in claim 12, wherein said actuator is movable between a first stop position in which said spring arm is not in contact with said fixed contact structure and a second stop position in which said spring arm is deflected to bring the contact portion thereof into contact with said fixed contact structure, and wherein the distance moved by said actuator from said first stop position to said second stop position is greater than the distance necessary to bring the contact portion of said spring arm into contact with said fixed contact structure, whereby the closing force applied between said contact portion and said fixed contact structure is increased.

14. A ground fault circuit interrupter plug as claimed in claim 13, wherein the free end of said spring arm is resiliently biased into contact with said actuator when said actuator is in said first stop position in order to maintain a preload force on said spring arm.

15. A contact arrangement for use in a ground fault circuit interrupter plug, comprising
    a circuit board;
    an integral plug blade and fixed contact structure carried by said circuit board, said plug blade and said fixed contact structure being formed from a continuous strip of metal that is secured at an intermediate point to said circuit board, with the portion of said strip on one side of said intermediate point forming said fixed contact structure and the portion of said strip on the other side of said intermediate point forming said plug blade;
    a movable contact structure carried by said circuit board; and
    an actuator for moving said movable contact structure into contact with said fixed contact structure.

16. A contact arrangement as claimed in claim 15, wherein said integral plug blade and fixed contact structure and said movable contact structure are each mounted directly to said circuit board.

17. A contact arrangement as claimed in claim 15, wherein the portion of said strip forming said fixed contact structure lies in a plane that is substantially orthongonal to the plane of said plug blade and parallel to the longitudinal axis of said plug blade.

18. A contact arrangement as claimed in claim 15, wherein said movable contact structure comprises a cantilevered spring arm having one end secured to said circuit board and a free end opposite to said secured end.

19. A contact arrangement as claimed in claim 18, wherein said actuator bears on the free end of said spring arm in order to deflect said spring arm into contact with said fixed contact structure, and wherein said spring arm includes a contact portion located at an intermediate point between said free end and said secured end for contacting said fixed contact structure during such deflection.

20. A contact arrangement as claimed in claim 19, wherein said actuator is movable between a first stop position in which said spring arm is not in contact with said fixed contact structure and a second stop position in which said spring arm is deflected to bring the contact portion thereof into contact with said fixed contact structure, and wherein the distance moved by said actuator from said first stop position to said second stop position is greater than the distance necessary to bring the contact portion of said spring arm into contact with said fixed contact structure, whereby the closing force applied between said contact portion and said fixed contact structure is increased.

21. A contact arrangement as claimed in claim 20, wherein the free end of said spring arm is resiliently biased into contact with said actuator when said actuator is in said first stop position in order to maintain a preload force on said spring arm.

22. A method for opening and closing the line or neutral side of an AC load in a ground fault circuit interrupter, comprising steps of:
    providing a fixed relay contact structure and a movable relay contact structure which is movable into and out of contact with said fixed relay contact structure, said movable contact structure being provided in the form of a cantilevered spring arm having a secured end, a free end, and a contact portion located at an intermediate point between said secured end and said free end for contacting said fixed contact structure;
    connecting one of said fixed and movable relay contact structures to the line or neutral side of an AC source and the other of said fixed and movable contact structures to the same side of said AC load;
    opening said line or neutral side of said AC load by moving said spring arm to a first stop position in which said spring arm is not in contact with said fixed relay contact structure; and
    closing said line or neutral side of said AC load by applying a force to the free end of said spring arm to move said spring arm to a second stop position in which said spring arm is deflected to bring the contact portion thereof into contact with said fixed relay contact structure;
    wherein the distance moved by the free end of said spring arm from said first stop position to said second stop position is greater than the distance necessary to bring the contact portion of said spring arm into contact with said fixed relay contact structure, whereby the closing force applied between said contact portion and said fixed relay contact structure is increased.

23. A method as claimed in claim 22, further comprising the step of maintaining a preload force on said spring arm by resiliently deflecting said spring arm toward said fixed relay contact structure while said spring arm is in said first stop position.

* * * * *